US009239595B2

(12) United States Patent
Liang

(10) Patent No.: US 9,239,595 B2
(45) Date of Patent: Jan. 19, 2016

(54) ELECTRONIC SYSTEM AND CONNECTING MECHANISM THEREOF
(71) Applicant: Wistron Corporation, New Taipei (TW)
(72) Inventor: Chen-Yi Liang, New Taipei (TW)
(73) Assignee: Wistron Corporation, Hsichih, New Taipei (TW)
( * ) Notice: Subject to any disclaimer, the term of this patent is extended or adjusted under 35 U.S.C. 154(b) by 289 days.
(21) Appl. No.: 14/085,806
(22) Filed: Nov. 21, 2013
(65) Prior Publication Data
US 2015/0017820 A1 Jan. 15, 2015
(30) Foreign Application Priority Data
Jul. 11, 2013 (TW) .............................. 102124986 A
(51) Int. Cl.
*G06F 1/16* (2006.01)
*H01R 13/62* (2006.01)
(52) U.S. Cl.
CPC .......... *G06F 1/1654* (2013.01); *H01R 13/6205* (2013.01)
(58) Field of Classification Search
CPC ... G06F 1/1616; G06F 1/1632; G06F 1/1654; G06F 1/1669; G06F 1/1679
USPC ............................ 361/679.29, 679.41, 679.55
See application file for complete search history.

(56) References Cited

U.S. PATENT DOCUMENTS

| 6,366,440 B1* | 4/2002 | Kung ...................... E05C 19/16 361/147 |
| 2004/0174670 A1* | 9/2004 | Huang et al. .......... G06F 1/1626 361/679.17 |
| 2005/0167992 A1* | 8/2005 | Lo et al. ................... E05C 19/16 292/251.5 |
| 2006/0006674 A1* | 1/2006 | Kang et al. .............. E05C 19/16 292/251.5 |
| 2006/0056140 A1* | 3/2006 | Lev ....................... E05C 19/163 361/679.27 |
| 2007/0121303 A1* | 5/2007 | Wang et al. ......... H04M 1/0222 361/752 |
| 2007/0138806 A1* | 6/2007 | Ligtenberg et al. ..... E05C 19/16 292/251.5 |
| 2007/0155214 A1* | 7/2007 | Shih et al. ........... H04M 1/0237 439/326 |
| 2007/0277349 A1* | 12/2007 | Yu ....................... H04M 1/0262 16/320 |
| 2008/0024964 A1* | 1/2008 | Lev et al. .............. G06F 1/1679 361/679.21 |
| 2008/0134467 A1* | 6/2008 | Cheng et al. .......... E05D 11/081 16/320 |
| 2009/0103261 A1* | 4/2009 | Shih ...................... E05C 19/16 361/679.58 |
| 2010/0176698 A1* | 7/2010 | Wu et al. ............... G06F 1/1616 312/223.1 |
| 2010/0238620 A1* | 9/2010 | Fish ...................... G06F 1/1616 361/679.09 |
| 2010/0271771 A1* | 10/2010 | Wu et al. ............... G06F 1/1616 361/679.17 |
| 2010/0321877 A1* | 12/2010 | Moser ................... G06F 1/1616 361/679.29 |
| 2013/0031289 A1* | 1/2013 | Yeh et al. .............. G06F 1/1632 710/303 |
| 2013/0107431 A1* | 5/2013 | Xu ........................ G06F 1/1616 361/679.01 |
| 2013/0242490 A1* | 9/2013 | Ku ........................ G06F 1/1628 361/679.3 |
| 2014/0133079 A1* | 5/2014 | Noguchi ............... G06F 1/1681 361/679.09 |
| 2014/0328019 A1* | 11/2014 | Liang .................... G06F 1/1632 361/679.55 |

* cited by examiner

*Primary Examiner* — Adrian S Wilson
(74) *Attorney, Agent, or Firm* — Winston Hsu; Scott Margo

(57) ABSTRACT

A connecting mechanism for connecting an electronic device to a docking station includes a first socket, a first magnet, a fixing member, a first magnetic induction member, a first engaging member and a first driving member. The first socket is movably disposed in the electronic device and a first engaging recess is formed on a side of the first socket. The first magnet is disposed in the first socket. The fixing member is disposed on the docking station. The first magnetic induction member is disposed on the fixing member and corresponding to the first magnet. The first engaging member is movably disposed on the fixing member and has a first engaging portion. The first driving member is disposed between the fixing member and the first engaging member.

19 Claims, 10 Drawing Sheets

ELECTRONIC SYSTEM AND CONNECTING MECHANISM THEREOF

BACKGROUND OF THE INVENTION

1. Field of the Invention

The invention relates to an electronic system and a connecting mechanism thereof and, more particularly, to a connecting mechanism capable of attaching/detaching an electronic device to/from a docking station rapidly and an electronic system equipped with the connecting mechanism.

2. Description of the Prior Art

As technology advances and develops, various electronic devices, such as a tablet computer, a mobile phone, a personal digital assistant, an electronic book, etc. have been considered a necessity by a lot of people in daily life. Furthermore, with development of touch technology, a touch panel has become a main tool for data input in the aforesaid electronic devices. However, if a user needs to input a larger number of letters, symbols and/or numerals (e.g. to keep account or trial balance) in a short time, the touch panel is more inconvenient than a keyboard for operation. So far a connecting port is installed on a bottom of an electronic device and used for connecting an external keyboard for the user to input letters, symbols and/or numerals. However, the aforesaid connecting manner is unstable, such that the external keyboard may come off the electronic device easily due to collision or pull-drag effect, and then that will persecute the user.

SUMMARY OF THE INVENTION

The invention provides a connecting mechanism capable of attaching/detaching an electronic device to/from a docking station rapidly and an electronic system equipped with the connecting mechanism, so as to solve the aforesaid problems.

According to an embodiment of the invention, a connecting mechanism for connecting an electronic device to a docking station comprises a first socket, a first magnet, a fixing member, a first magnetic induction member, a first engaging member and a first driving member. The first socket is movably disposed in the electronic device and a first engaging recess is formed on a side of the first socket.

The first magnet is disposed in the first socket. The fixing member is disposed on the docking station. The first magnetic induction member is disposed on the fixing member and corresponding to the first magnet. The first engaging member is movably disposed on the fixing member and has a first engaging portion. The first driving member is disposed between the fixing member and the first engaging member.

When the first magnetic induction member approaches the first magnet, a first magnetic attraction force is generated between the first magnetic induction member and the first magnet, such that the first magnet drives the first socket to move toward the first magnetic induction member, and then the first socket pushes the first engaging portion, such that the first engaging member moves away from the first socket. When the first magnetic induction member and the first magnet are attached to each other, the first driving member drives the first engaging member to move toward the first socket, such that the first engaging portion is engaged in the first engaging recess.

According to another embodiment of the invention, an electronic system comprises the aforesaid electronic device, docking station and connecting mechanism.

As mentioned in the above, when a user wants to connect the electronic device to the docking station, he/she only has to take the magnetic induction member of the docking station to approach the magnet of the electronic device. Then, the magnetic induction member and the magnet are attached to each other due to the magnetic attraction force and the engaging portion of the engaging member is engaged in the engaging recess of the socket automatically. Accordingly, the user can attach the electronic device to the docking station rapidly without alignment operation. Since the electronic device is connected to the docking station by the connecting mechanism through magnetic attraction and engagement at the same time, the invention can prevent the docking station from coming off the electronic device due to collision or pull-drag effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
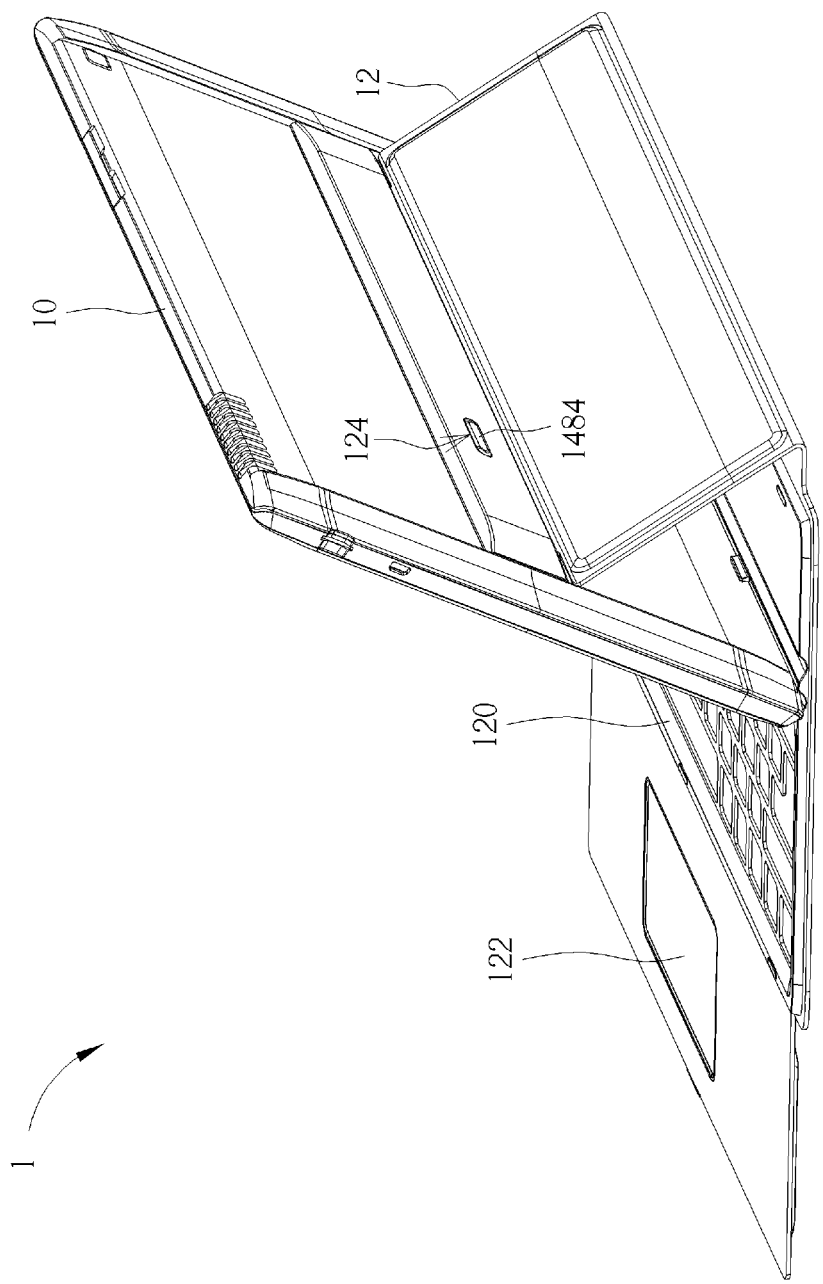
FIG. 1 is a perspective view illustrating an electronic system according to an embodiment of the invention.
Figure 2:
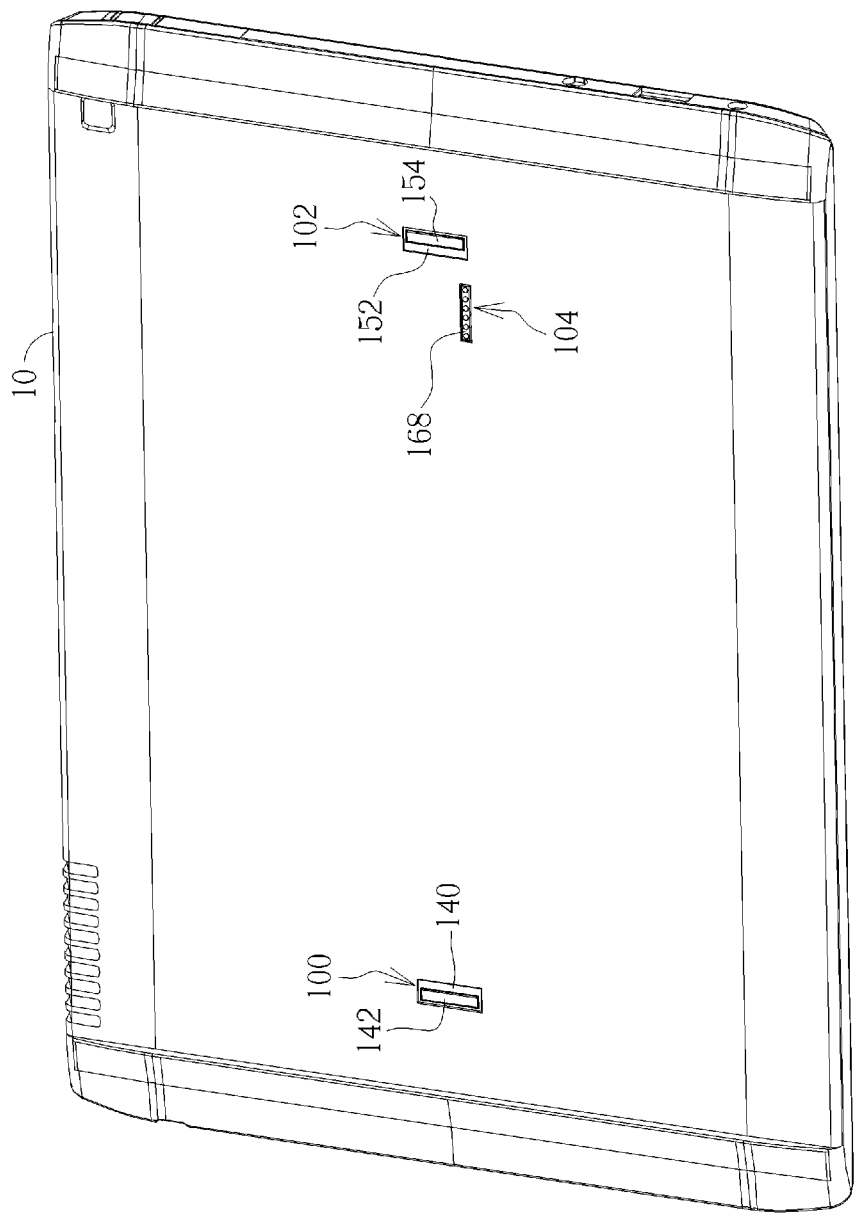
FIG. 2 is a rear perspective view illustrating the electronic device shown in FIG. 1.
Figure 3:
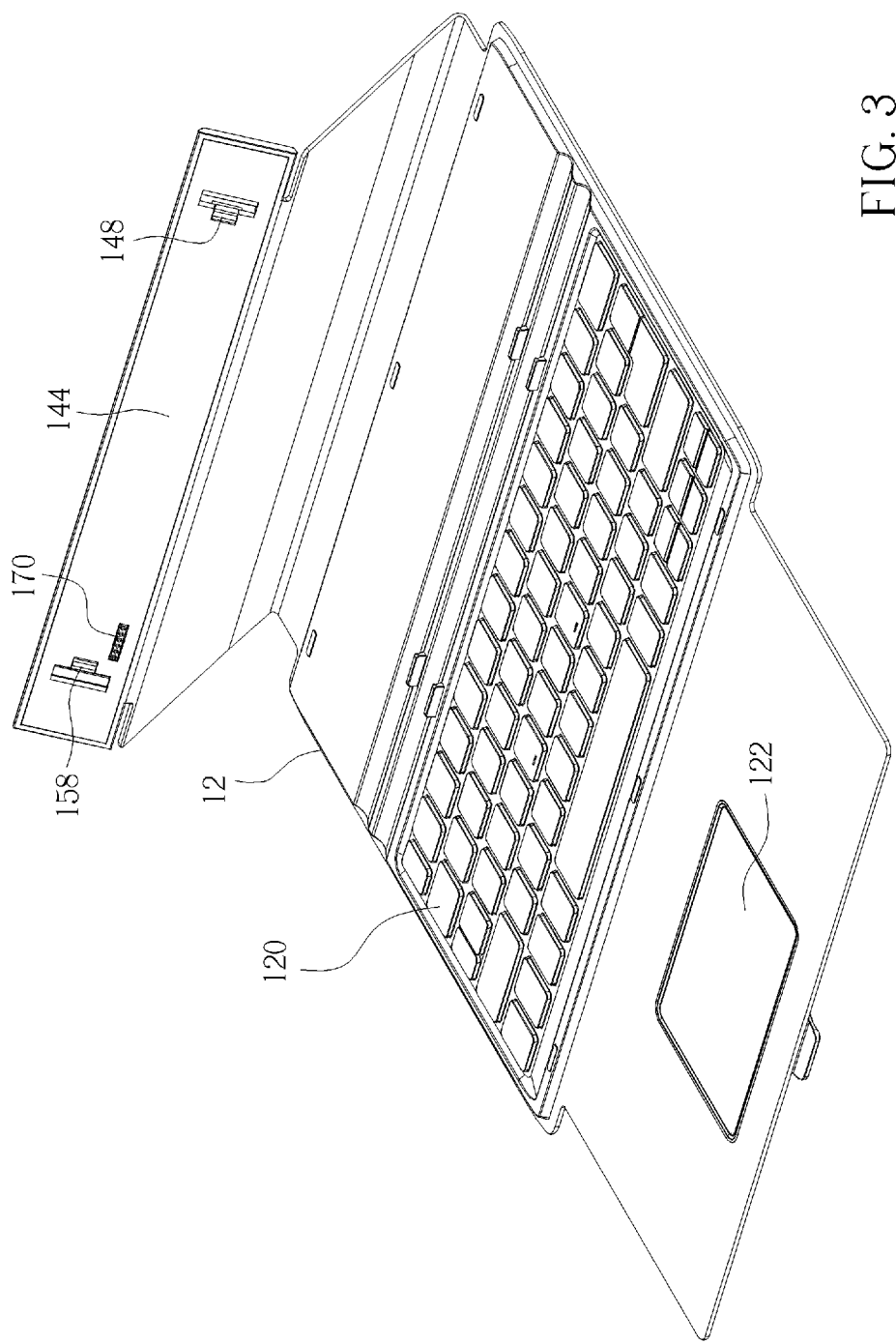
FIG. 3 is a front perspective view illustrating the docking station shown in FIG. 1.
Figure 4:
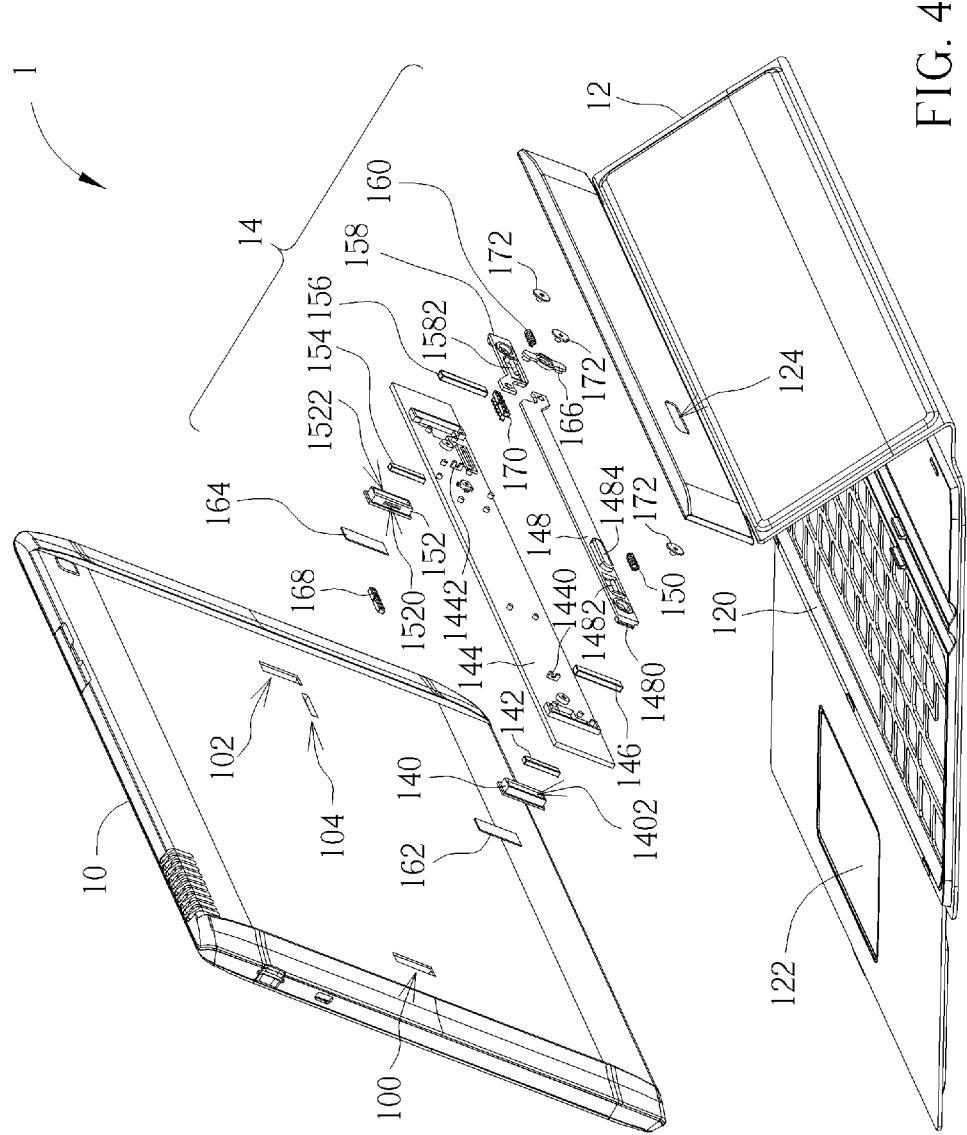
FIG. 4 is an exploded view illustrating the electronic system shown in FIG. 1.
Figure 5:
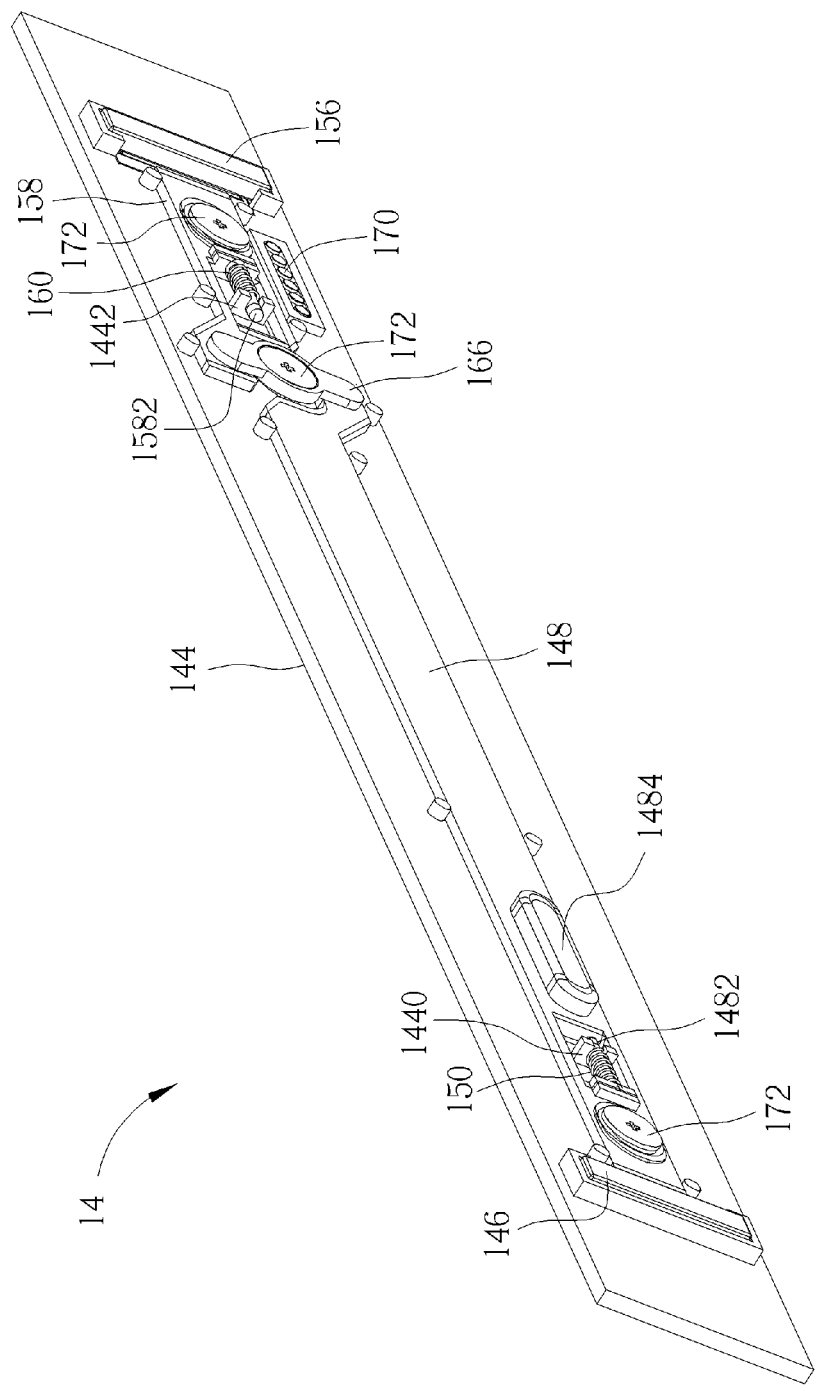
FIG. 5 is an assembly view illustrating parts of the connecting mechanism shown in FIG. 4.

Referring to FIGS. 1 to 5, FIG. 1 is a perspective view illustrating an electronic system 1 according to an embodiment of the invention, FIG. 2 is a rear perspective view illustrating the electronic device 10 shown in FIG. 1, FIG. 3 is a front perspective view illustrating the docking station 12 shown in FIG. 1, FIG. 4 is an exploded view illustrating the electronic system 1 shown in FIG. 1, and FIG. 5 is an assembly view illustrating parts of the connecting mechanism 14 shown in FIG. 4.

As shown in FIGS. 1 to 5, the electronic system 1 of the invention comprises an electronic device 10, a docking station 12 and a connecting mechanism 14, wherein the connecting mechanism 14 is used for connecting the electronic device 10 to the docking station 12. In this embodiment, the electronic device 10 may be a tablet computer and the docking station 12 may comprise a keyboard 120 and a touch panel 122. However, in another embodiment, the electronic device 10 may also be a mobile phone, a personal digital assistant, an electronic book or other portable electronic devices, and the docking station 12 may also comprise a charging module, a communication module, a universal serial bus (USB) connecting port or other function modules according to practical applications. It should be noted that the docking station 12 may also comprise the keyboard 120 or the touch panel 122 only according to practical applications.

In this embodiment, the connecting mechanism 14 comprises a first socket 140, a first magnet 142, a fixing member 144, a first magnetic induction member 146, a first engaging member 148, a first driving member 150, a second socket 152, a second magnet 154, a second magnetic induction member 156, a second engaging member 158, a second driving member 160, a third magnetic induction member 162, a fourth magnetic induction member 164, a linking member 166, a first electric connector 168 and a second electric connector 170.

Figure 6:
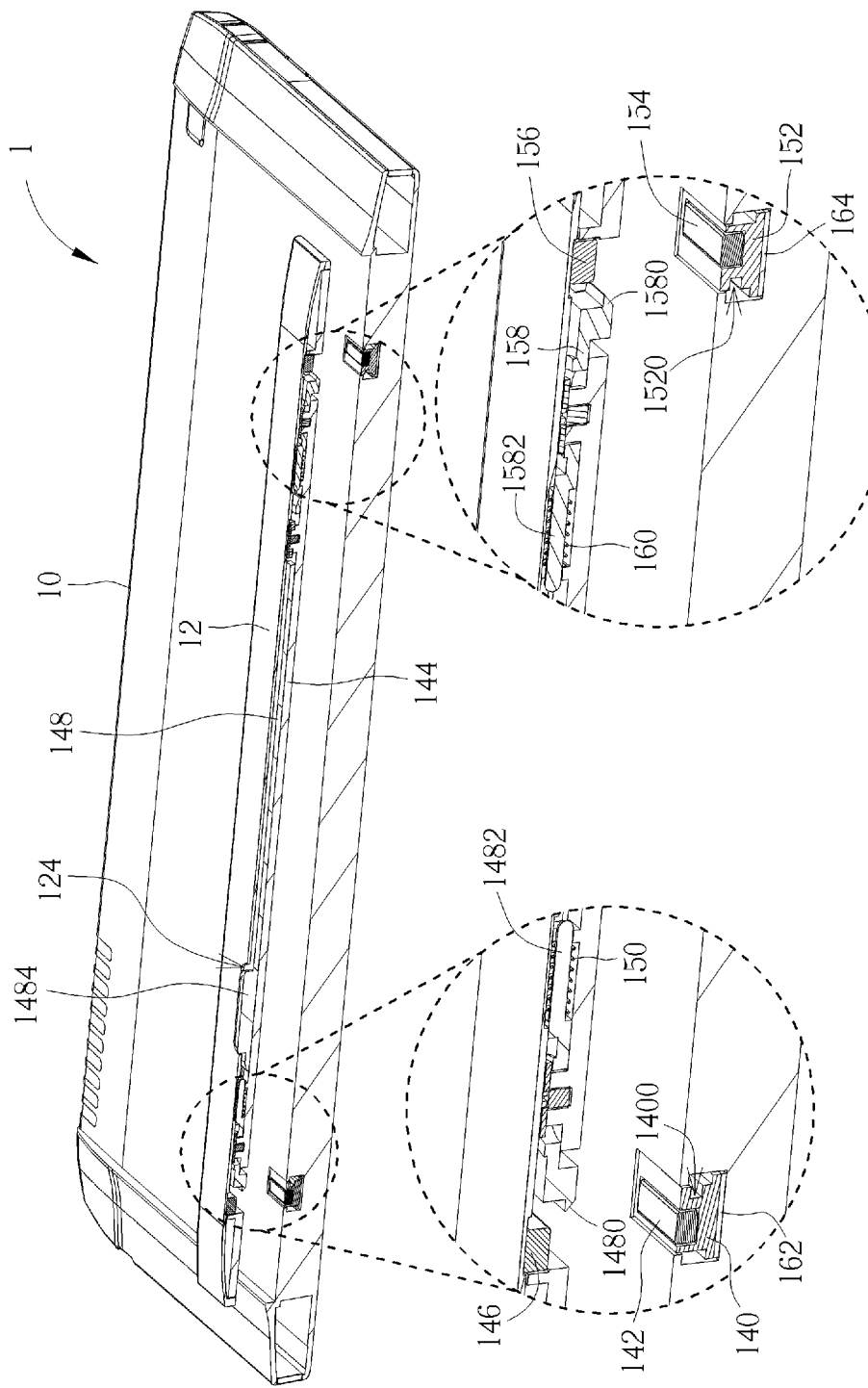
FIG. 6 is a cross-sectional perspective view illustrating the electronic device apart from the docking station.
Figure 7:
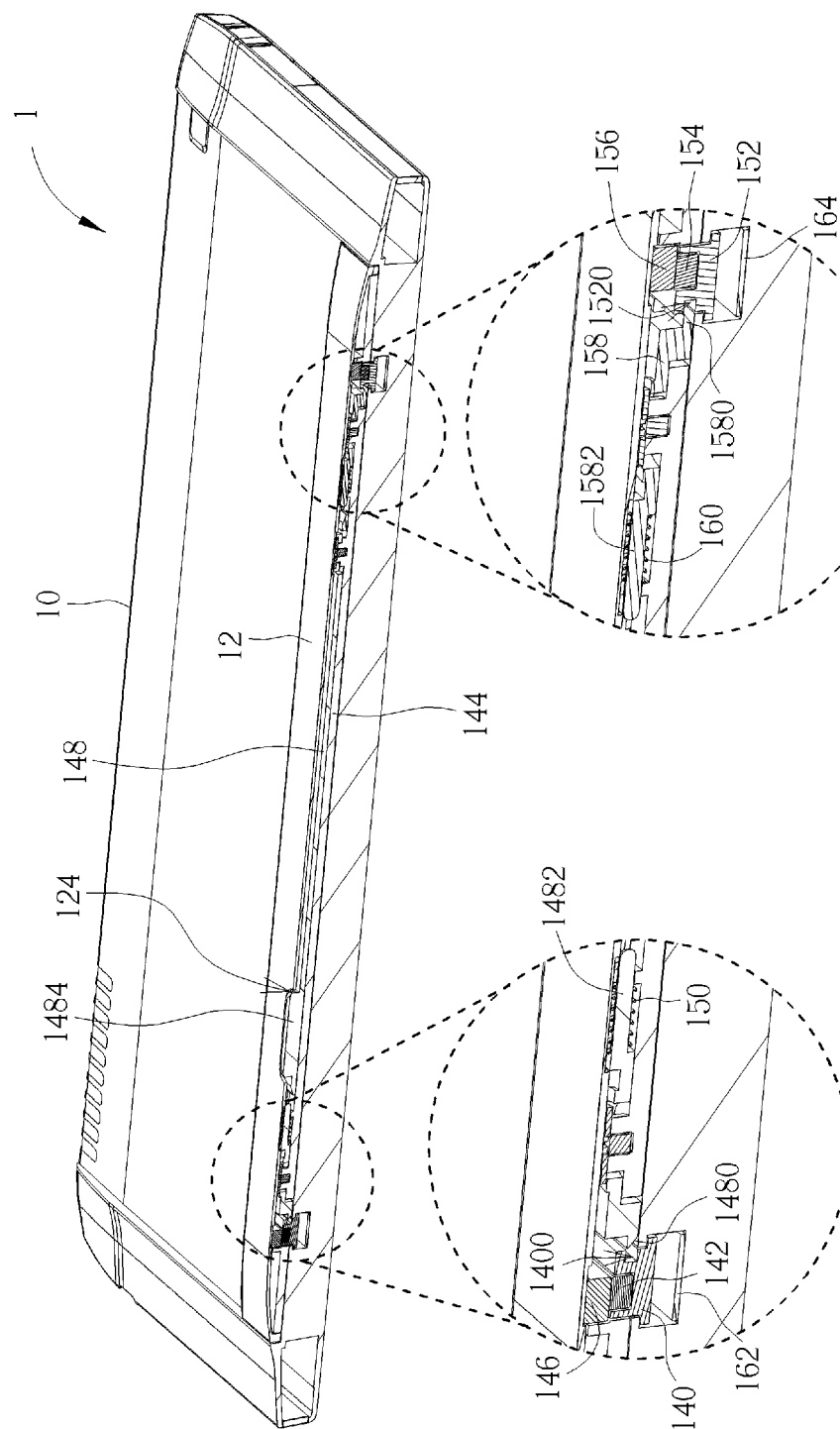
FIG. 7 is a cross-sectional perspective view illustrating the first magnetic induction member and the first magnet attached to each other and the second magnetic induction member and the second magnet attached to each other.
Figure 8:
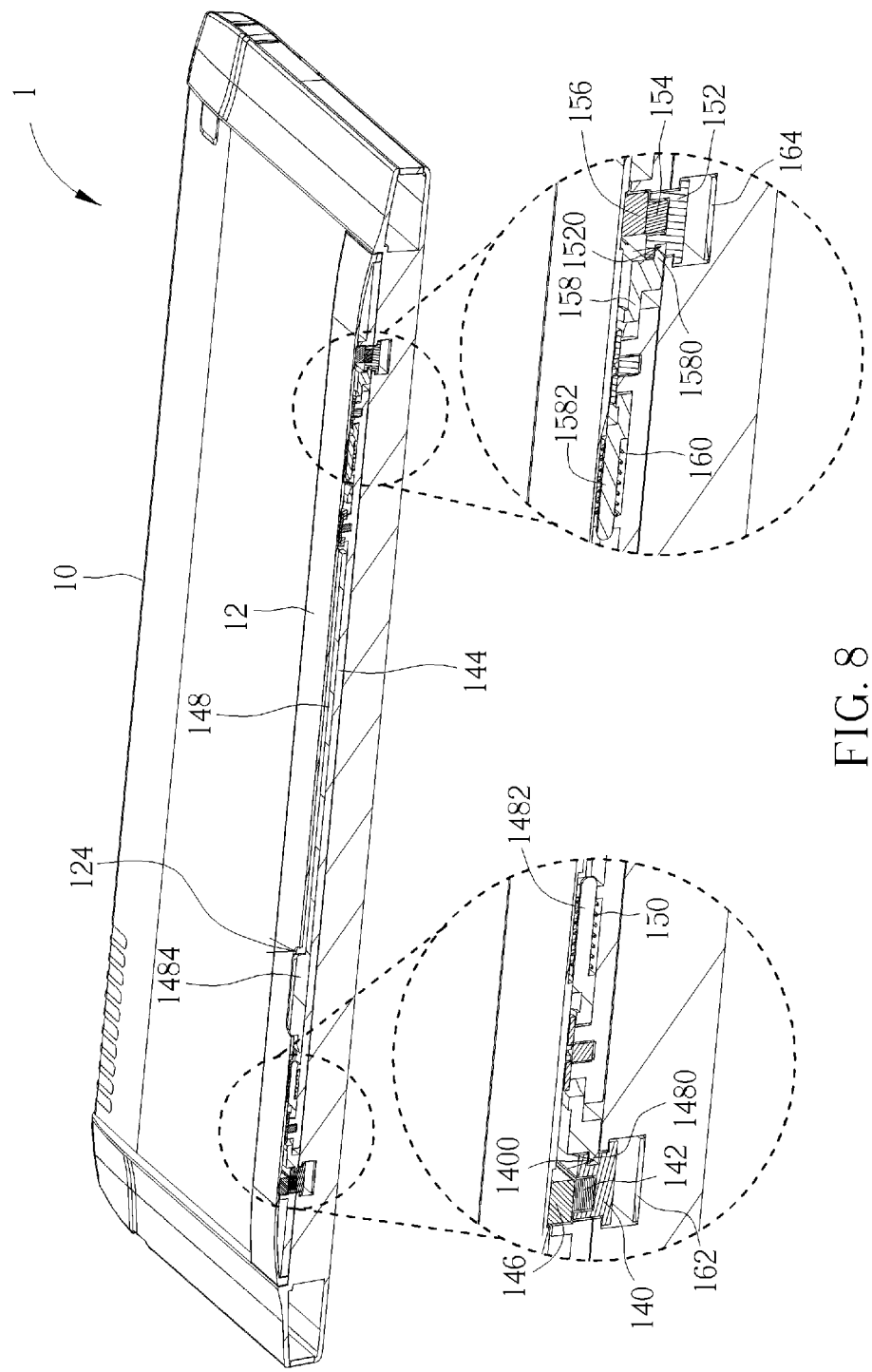
FIG. 8 is a cross-sectional perspective view illustrating the first engaging member engaged with the first socket and the second engaging member engaged with the second socket.

Also, referring to FIGS. 6 to 8, FIG. 6 is a cross-sectional perspective view illustrating the electronic device 10 apart from the docking station 12, FIG. 7 is a cross-sectional perspective view illustrating the first magnetic induction member 146 and the first magnet 142 attached to each other and the second magnetic induction member 156 and the second magnet 154 attached to each other, and FIG. 8 is a cross-sectional perspective view illustrating the first engaging member 148 engaged with the first socket 140 and the second engaging member 158 engaged with the second socket 152.

In this embodiment, there are three accommodating recesses 100, 102, 104 formed on a back side of the electronic device 10. The first socket 140 and the second socket 152 are movably disposed in the accommodating recesses 100, 102 of the electronic device 10, respectively, wherein a first engaging recess 1400 is formed on a side of the first socket 140 and a second engaging recess 1520 is formed on a side of the second socket 152. Furthermore, the first electric connector 168 is disposed in the accommodating recess 104 of the electronic device 10. The first magnet 142 is disposed in an accommodating recess 1402 of the first socket 140 and the second magnet 154 is disposed in an accommodating recess 1522 of the second socket 152. The third magnetic induction member 162 is disposed in the accommodating recess 100 of the electronic device 10 and located between the first socket 140 and the electronic device 10. The fourth magnetic induction member 164 is disposed in the accommodating recess 102 of the electronic device 10 and located between the second socket 152 and the electronic device 10.

The fixing member 144 is disposed on an end of the docking station 12. The first magnetic induction member 146 and the second magnetic induction member 156 are disposed on opposite ends of the fixing member 144, respectively, wherein the first magnetic induction member 146 is corresponding to the first magnet 142 and the second magnetic induction member 156 is corresponding to the second magnet 154. In this embodiment, each of the first magnetic induction member 146, the second magnetic induction member 156, the third magnetic induction member 162 and the fourth magnetic induction member 164 maybe a magnet or be made of a material capable of generating magnetism inducted by a magnet. The first engaging member 148 and the second engaging member 158 are movably disposed on the fixing member 144, wherein the first engaging member 148 has a first engaging portion 1480 and the second engaging member 158 has a second engaging portion 1580. The first driving member 150 is disposed between the fixing member 144 and the first engaging member 148, and the second driving member 160 is disposed between the fixing member 144 and the second engaging member 158.

In this embodiment, the first engaging member 148 has a first cantilever portion 1482, the second engaging member 158 has a second cantilever portion 1582, and the fixing member 144 has a first fixing portion 1440 and a second fixing portion 1442. The first cantilever portion 1482 is movably engaged with the first fixing portion 1440 and the second cantilever portion 1582 is movably engaged with the second fixing portion 1442. In this embodiment, each of the first driving member 150 and the second driving member 160 may be, but not limited to, a spring. The first driving member 150 is sleeved on the first cantilever portion 1482 and opposite ends of the first driving member 150 abut against the first engaging member 148 and the first fixing portion 1440, respectively. The second driving member 160 is sleeved on the second cantilever portion 1582 and opposite ends of the second driving member 160 abut against the second engaging member 158 and the second fixing portion 1442, respectively. When the first engaging member 148 and the second engaging member 158 move with respect to the fixing member 144 to compress the first driving member 150 and the second driving member 160, respectively, the first driving member 150 and the second driving member 160 are used for providing return force for the first engaging member 148 and the second engaging member 158, respectively. However, in another embodiment, the first driving member 150 and the second driving member 160 may also be replaced by magnets capable of generating magnetic attraction force or magnetic repulsion force or be replaced by resilient plastic arms according to practical applications.

The linking member 166 is rotatably disposed on the fixing member 144, wherein opposite ends of the linking member 166 are connected to the first engaging member 148 and the second engaging member 158, respectively, so as to drive the first engaging member 148 and the second engaging member 158 to move simultaneously. In this embodiment, the first engaging member 148, the second engaging member 158 and the linking member 166 may be fixed on the fixing member 144 by three screws 172. However, in another embodiment, the first engaging member 148, the second engaging member 158 and the linking member 166 may also be fixed on the fixing member 144 by hot melt adhesives, engaging structures, rivets and so on according to practical applications. Furthermore, the second electric connector 170 is also disposed on the fixing member 144. In this embodiment, the first electric connector 168 and the second electric connector 170 may be male-female pogo pin connectors or other electric connectors.

As shown in FIG. 6, when the electric device 10 has not been connected to the docking station 12 yet, a third magnetic attraction force is generated between the third magnetic induction member 162 and the first magnet 142 and a fourth magnetic attraction force is generated between the fourth magnetic induction member 164 and the second magnet 154, such that the first socket 140 and the second socket 152 sink into the accommodating recesses 100, 102 of the electronic device 10, respectively. Accordingly, the back side of the electronic device can be kept flat.

As shown in FIG. 7, when a user wants to connect the electronic device 10 to the docking station 12, he/she has to attach one end of the docking station 12 to the back side of the electronic device 10. When the first magnetic induction member 146 approaches the first magnet 142, a first magnetic attraction force is generated between the first magnetic induction member 146 and the first magnet 142, such that the first magnet 142 drives the first socket 140 to move toward the first magnetic induction member 146. When the first socket 140 is moving toward the first magnetic induction member 146, the first socket 140 pushes the first engaging portion 1480, such that the first engaging member 148 moves away from the first socket 140. At this time, the first driving member 150 is being compressed. Similarly, when the second magnetic induction member 156 approaches the second magnet 154, a second magnetic attraction force is generated between the second magnetic induction member 156 and the second magnet 154, such that the second magnet 154 drives the second socket 152 to move toward the second magnetic induction member 156. When the second socket 152 is moving toward the second magnetic induction member 156, the second socket 152 pushes the second engaging portion 1580, such that the second engaging member 158 moves away from the second socket 152. At this time, the second driving member 160 is being compressed.

In this embodiment, the third magnetic attraction force generated between the third magnetic induction member 162 and the first magnet 142 is smaller than the first magnetic attraction force generated between the first magnetic induction member 146 and the first magnet 142. Therefore, the first magnet 142 may drive the first socket 140 to move toward the first magnetic induction member 146 so long as the first magnetic induction member 146 approaches the first magnet 142. Similarly, the fourth magnetic attraction force generated between the fourth magnetic induction member 164 and the second magnet 154 is smaller than the second magnetic attraction force generated between the second magnetic induction member 156 and the second magnet 154. Therefore, the second magnet 154 may drive the second socket 152 to move toward the second magnetic induction member 156 so long as the second magnetic induction member 156 approaches the second magnet 154.

As shown in FIG. 8, when the first magnetic induction member 146 and the first magnet 142 are attached to each other, the compressed first driving member 150 will generate a return force to drive the first engaging member 148 to move toward the first socket 140, such that the first engaging portion 1480 is engaged in the first engaging recess 1400. Similarly, when the second magnetic induction member 156 and the second magnet 154 are attached to each other, the compressed second driving member 160 will generate a return force to drive the second engaging member 158 to move toward the second socket 152, such that the second engaging portion 1580 is engaged in the second engaging recess 1520. It should be noted that when the first engaging member 148 and the second engaging member 158 are moving, the linking member 166 drives the first engaging member 148 and the second engaging member 158 to move simultaneously, such that the first engaging member 148 and the second engaging member 158 will move more smoothly. The first electric connector 168 is electrically connected to the second electric connector 170 when the first magnetic induction member 146 and the first magnet 142 are attached to each other and the second magnetic induction member 156 and the second magnet 154 are attached to each other. Accordingly, the electronic device 10 can communicate with the docking station 12. At this time, the user can operate the keyboard 120 and/or the touch panel 122 on the docking station 12 to control the electronic device 10 to execute specific functions.

Figure 9:
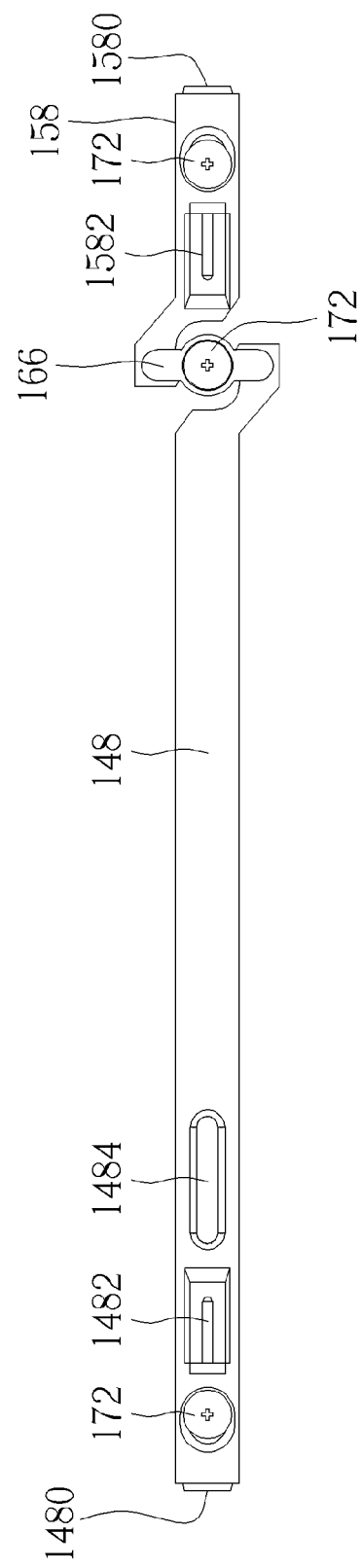
FIG. 9 is a schematic view illustrating the first engaging member and the second engaging member shown in FIG. 6 before movement.
Figure 10:
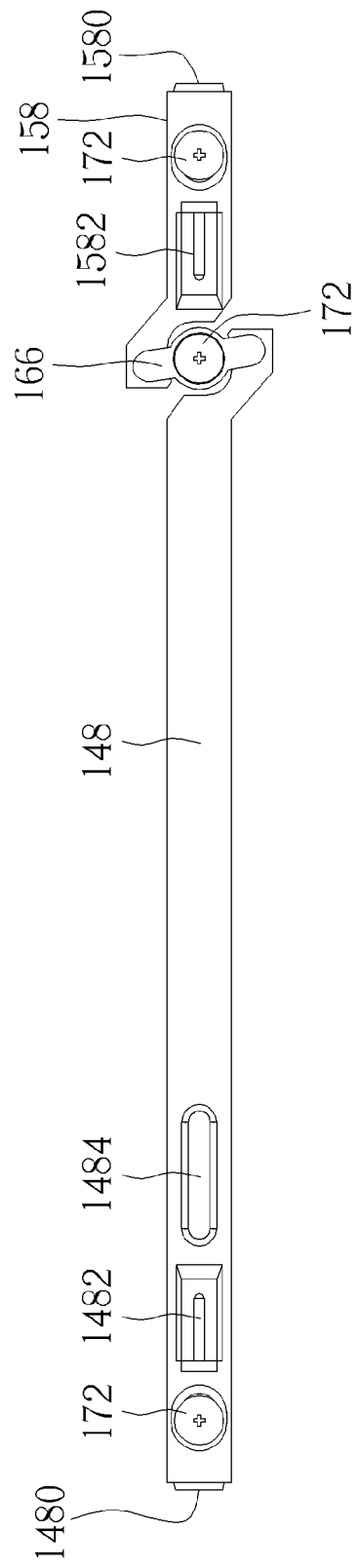
FIG. 10 is a schematic view illustrating the first engaging member and the second engaging member shown in FIG. 7 after movement.

Also, referring to FIGS. 9 and 10, FIG. 9 is a schematic view illustrating the first engaging member 148 and the second engaging member 158 shown in FIG. 6 before movement, and FIG. 10 is a schematic view illustrating the first engaging member 148 and the second engaging member 158 shown in FIG. 7 after movement. In this embodiment, the first engaging member 148 has an operating portion 1484 movably disposed in a slot 124 formed on one end of the docking station 12. The operating portion 1484 is capable of being pushed to drive the first engaging member 148 to move away from the first socket 140, so as to disengage the first engaging portion 1480 from the first engaging recess 1400. Since the linking member 166 can drive the first engaging member 148 and the second engaging member 158 to move simultaneously (as shown in FIGS. 9 and 10), the second engaging member 158 may also move away from the second socket 152 when the operating portion 1484 is being pushed, such that the second engaging portion 1580 is disengaged from the second engaging recess 1520. Then, the user can detach the electronic device 10 from the docking station 12.

It should be noted that the connecting mechanism 14 of the invention may also utilize the first socket 140, the first magnet 142, the first magnetic induction member 146, the first engaging member 148, the first driving member 150 and the third magnetic induction member 162 only to attach/detach the electronic device 10 to/from the docking station 12 rapidly.

As mentioned in the above, when a user wants to connect the electronic device to the docking station, he/she only has to take the magnetic induction member of the docking station to approach the magnet of the electronic device. Then, the magnetic induction member and the magnet are attached to each other due to the magnetic attraction force and the engaging portion of the engaging member is engaged in the engaging recess of the socket automatically.

Accordingly, the user can attach the electronic device to the docking station rapidly without alignment operation. Since the electronic device is connected to the docking station by the connecting mechanism through magnetic attraction and engagement at the same time, the invention can prevent the docking station from coming off the electronic device due to collision or pull-drag effect. Furthermore, the user only has to push the operating portion of the engaging member to disengage the engaging portion of the engaging member from the engaging recess of the socket, such that he/she can detach the electronic device from the docking station easily. Moreover, when the electronic device has not been connected to the docking station yet, the socket will sink into the accommodating recess of the electronic device, such that the back side of the electronic device can be kept flat.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting mechanism for connecting an electronic device to a docking station, comprising:
   a first socket movably disposed in the electronic device, a first engaging recess being formed on a side of the first socket;
   a first magnet disposed in the first socket;
   a fixing member disposed on the docking station;
   a first magnetic induction member disposed on the fixing member and corresponding to the first magnet;
   a first engaging member movably disposed on the fixing member and having a first engaging portion; and
   a first driving member disposed between the fixing member and the first engaging member;
   wherein when the first magnetic induction member approaches the first magnet, a first magnetic attraction force is generated between the first magnetic induction member and the first magnet, such that the first magnet drives the first socket to move toward the first magnetic induction member, and then the first socket pushes the first engaging portion, such that the first engaging member moves away from the first socket; when the first magnetic induction member and the first magnet are attached to each other, the first driving member drives the first engaging member to move toward the first socket, such that the first engaging portion is engaged in the first engaging recess.

2. The connecting mechanism of claim 1, wherein the first engaging member has an operating portion, the operating portion is capable of being pushed to drive the first engaging member to move away from the first socket.

3. The connecting mechanism of claim 1, wherein the first engaging member has a first cantilever portion, the fixing member has a first fixing portion, the first cantilever portion is movably engaged with the first fixing portion, the first driving member is a spring, the first driving member is sleeved on the first cantilever portion, and opposite ends of the first driving member abut against the first engaging member and the first fixing portion, respectively.

4. The connecting mechanism of claim 1, further comprising:
a second socket movably disposed in the electronic device, a second engaging recess being formed on a side of the second socket;
a second magnet disposed in the second socket;
a second magnetic induction member disposed on the fixing member and corresponding to the second magnet;
a second engaging member movably disposed on the fixing member and having a second engaging portion; and
a second driving member disposed between the fixing member and the second engaging member;
wherein when the second magnetic induction member approaches the second magnet, a second magnetic attraction force is generated between the second magnetic induction member and the second magnet, such that the second magnet drives the second socket to move toward the second magnetic induction member, and then the second socket pushes the second engaging portion, such that the second engaging member moves away from the second socket; when the second magnetic induction member and the second magnet are attached to each other, the second driving member drives the second engaging member to move toward the second socket, such that the second engaging portion is engaged in the second engaging recess.

5. The connecting mechanism of claim 4, further comprising:
a third magnetic induction member disposed between the first socket and the electronic device, a third magnetic attraction force being generated between the third magnetic induction member and the first magnet, the third magnetic attraction force being smaller than the first magnetic attraction force; and
a fourth magnetic induction member disposed between the second socket and the electronic device, a fourth magnetic attraction force being generated between the fourth magnetic induction member and the second magnet, the fourth magnetic attraction force being smaller than the second magnetic attraction force.

6. The connecting mechanism of claim 4, wherein the second engaging member has a second cantilever portion, the fixing member has a second fixing portion, the second cantilever portion is movably engaged with the second fixing portion, the second driving member is a spring, the second driving member is sleeved on the second cantilever portion, and opposite ends of the second driving member abut against the second engaging member and the second fixing portion, respectively.

7. The connecting mechanism of claim 4, further comprising a linking member rotatably disposed on the fixing member, opposite ends of the linking member being connected to the first engaging member and the second engaging member, respectively, so as to drive the first engaging member and the second engaging member to move simultaneously.

8. The connecting mechanism of claim 4, wherein two accommodating recesses are formed on a back side of the electronic device, and the first socket and the second socket are movably disposed in the two accommodating recesses, respectively.

9. The connecting mechanism of claim 1, further comprising a first electric connector and a second electric connector, the first electric connector being disposed on the electronic device, the second electric connector being disposed on the fixing member, and the first electric connector being electrically connected to the second electric connector when the first magnetic induction member and the first magnet are attached to each other.

10. An electronic system comprising:
an electronic device;
a docking station; and
a connecting mechanism for connecting an electronic device to a docking station, comprising:
a first socket movably disposed in the electronic device, a first engaging recess being formed on a side of the first socket;
a first magnet disposed in the first socket;
a fixing member disposed on the docking station;
a first magnetic induction member disposed on the fixing member and corresponding to the first magnet;
a first engaging member movably disposed on the fixing member and having a first engaging portion; and
a first driving member disposed between the fixing member and the first engaging member;
wherein when the first magnetic induction member approaches the first magnet, a first magnetic attraction force is generated between the first magnetic induction member and the first magnet, such that the first magnet drives the first socket to move toward the first magnetic induction member, and then the first socket pushes the first engaging portion, such that the first engaging member moves away from the first socket; when the first magnetic induction member and the first magnet are attached to each other, the first driving member drives the first engaging member to move toward the first socket, such that the first engaging portion is engaged in the first engaging recess.

11. The electronic system of claim 10, wherein the first engaging member has an operating portion, the operating portion is capable of being pushed to drive the first engaging member to move away from the first socket.

12. The electronic system of claim 10, wherein the first engaging member has a first cantilever portion, the fixing member has a first fixing portion, the first cantilever portion is movably engaged with the first fixing portion, the first driving member is a spring, the first driving member is sleeved on the first cantilever portion, and opposite ends of the first driving member abut against the first engaging member and the first fixing portion, respectively.

13. The electronic system of claim 10, wherein the connecting mechanism further comprises:
a second socket movably disposed in the electronic device, a second engaging recess being formed on a side of the second socket;
a second magnet disposed in the second socket;

a second magnetic induction member disposed on the fixing member and corresponding to the second magnet;

a second engaging member movably disposed on the fixing member and having a second engaging portion; and a second driving member disposed between the fixing member and the second engaging member;

wherein when the second magnetic induction member approaches the second magnet, a second magnetic attraction force is generated between the second magnetic induction member and the second magnet, such that the second magnet drives the second socket to move toward the second magnetic induction member, and then the second socket pushes the second engaging portion, such that the second engaging member moves away from the second socket; when the second magnetic induction member and the second magnet are attached to each other, the second driving member drives the second engaging member to move toward the second socket, such that the second engaging portion is engaged in the second engaging recess.

14. The electronic system of claim 13, wherein the connecting mechanism further comprises:

a third magnetic induction member disposed between the first socket and the electronic device, a third magnetic attraction force being generated between the third magnetic induction member and the first magnet, the third magnetic attraction force being smaller than the first magnetic attraction force; and a fourth magnetic induction member disposed between the second socket and the electronic device, a fourth magnetic attraction force being generated between the fourth magnetic induction member and the second magnet, the fourth magnetic attraction force being smaller than the second magnetic attraction force.

15. The electronic system of claim 13, wherein the second engaging member has a second cantilever portion, the fixing member has a second fixing portion, the second cantilever portion is movably engaged with the second fixing portion, the second driving member is a spring, the second driving member is sleeved on the second cantilever portion, and opposite ends of the second driving member abut against the second engaging member and the second fixing portion, respectively.

16. The electronic system of claim 13, wherein the connecting mechanism further comprises a linking member rotatably disposed on the fixing member, and opposite ends of the linking member are connected to the first engaging member and the second engaging member, respectively, so as to drive the first engaging member and the second engaging member to move simultaneously.

17. The electronic system of claim 13, wherein two accommodating recesses are formed on a back side of the electronic device, and the first socket and the second socket are movably disposed in the two accommodating recesses, respectively.

18. The electronic system of claim 10, wherein the connecting mechanism further comprises a first electric connector and a second electric connector, the first electric connector is disposed on the electronic device, the second electric connector is disposed on the fixing member, and the first electric connector is electrically connected to the second electric connector when the first magnetic induction member and the first magnet are attached to each other.

19. The electronic system of claim 10, wherein the electronic device is a tablet computer and the docking station comprises a keyboard and/or a touch panel.

* * * * *